United States Patent [19]

Landhuis

[11] Patent Number: 5,314,211
[45] Date of Patent: May 24, 1994

[54] COUPLING MEMBER WITH A TORQUE RESISTIVE-STOP

[75] Inventor: Kevin J. Landhuis, Rockford, Ill.

[73] Assignee: The Gates Rubber Company, Denver, Colo.

[21] Appl. No.: 955,395

[22] Filed: Oct. 1, 1992

Related U.S. Application Data

[63] Continuation-in-part of Ser. No. 844,273, Mar. 2, 1992, abandoned.

[51] Int. Cl.$^5$ .............................................. F16L 19/04
[52] U.S. Cl. .................... 285/110; 285/334.4; 285/354
[58] Field of Search ............ 285/110, 184, 354, 334.4, 285/332.4

[56] References Cited

U.S. PATENT DOCUMENTS

| | | | |
|---|---|---|---|
| 2,330,864 | 10/1943 | Bruno | 285/334.4 |
| 2,545,168 | 3/1951 | Richardson | 285/334.4 |
| 2,704,678 | 3/1955 | Klein et al. | 285/334.4 |
| 3,191,973 | 6/1965 | Guarnaschelli | 285/110 |
| 3,501,171 | 3/1970 | Baron | 285/334.4 |
| 3,502,355 | 3/1970 | Demler, Sr. et al. | 285/110 |
| 3,576,335 | 4/1971 | Kowal | 285/354 |
| 3,895,832 | 7/1975 | Ellis et al. | 285/334.4 |
| 4,005,879 | 2/1977 | Berger et al. | 285/354 |

FOREIGN PATENT DOCUMENTS

| | | | |
|---|---|---|---|
| 213476 | 6/1967 | Switzerland | 285/110 |
| 744183 | 6/1980 | U.S.S.R. | 285/334.4 |

*Primary Examiner*—Eric K. Nicholson
*Attorney, Agent, or Firm*—H. W. Oberg; S. G. Austin; C. H. Castleman, Jr.

[57] ABSTRACT

A coupling member of the type having a generally tubular body portion with a recessed annular element having a sealing surface portion, a swivel nut attached to the body portion and wherein the swivel nut has a concave frustoconical surface for engaging a second coupling member.

14 Claims, 2 Drawing Sheets

COUPLING MEMBER WITH A TORQUE RESISTIVE-STOP

This is a continuation-in-part of application Ser. No. 07/844,273 filed Mar. 2, 1992, now abandoned.

BACKGROUND OF THE INVENTION

The invention relates to pipe joints and couplings, but more particularly, the invention relates to a coupling member with a swivel nut and a resistive stop in conjunction with a frustoconical surface or flexible lip sealing means.

U.S. Pat. No. 5,002,316 to Chohan discloses a coupling member with a flexible lip that is effective as a sealing means when used in conjunction with a convex, tapered surface of a second coupling member that is commonly referred to as a flare type fitting. Most flare type fittings have a tapered or frustoconical surface at an angle of 37 degrees or 45 degrees. While coupling members of the type disclosed in the '704 patent have proved useful in effecting a fluid type seal when used with a flare fitting, they are subject to being over-tightened particularly for coupling sizes of less than ¾ in. Over tightening may occur because such couplings offer very little tactile feel to an operator when torquing a swivel nut to effect a seal with a flare type fitting. Coupling members below ¾ in. are susceptible to over torquing because the flexible lip operates at a smaller diameter and thereby provides less resistive torque than larger diameter fittings. Also, a swivel nut for the smaller swivel nut may have more threads per lineal inch than a larger nut and thereby has a greater mechanical advantage.

U.S. Pat. No. 3,672,704 to Christensen discloses a flexible lip fitting where the flexible lip is pressed against a non-standard, concave type frustoconical sealing surface. While the '704 fitting includes a positive stop which would preclude over-torquing of the coupling members during interconnection, the design requires the coupling members to be used in conjunction with each other as specially designed parts; in other words, the member with the lip seal could not be used in conjunction with a standard flare type fitting having a convex frustoconical sealing surface.

SUMMARY OF THE INVENTION

The coupling member of the invention is of the type with a recessed annular surface such as flexible lip or a frustoconical surface as a sealing means and a swivel nut that is used to attach the coupling member to a second coupling member. The coupling member of the invention is adapted to be used with standard flare type fittings having a convex frustoconical sealing surface, The swivel nut has a concave frustoconical surface located at a larger diameter than the flexible lip or a frustoconical surface and it is generally positioned along an imaginary frustoconical element from the flexible lip or a frustoconical surface. The concave surface operates as a means for contacting a tapered surface of the second flare type fitting so as to supplement a resistive torque of the swivel nut when it is torqued. The concave frustoconical surface of the swivel nut serves as a positioning means that precludes over-torquing the nut and in the case of a coupling member with a flexible lip, permanently deforming the flexible lip due to excessive strain.

An object of the invention is to provide a coupling member with a lip seal and a limiting device so that the lip of the member is not permanently deformed when a swivel nut is torqued beyond a recommended value.

Another object of the invention is to provide a coupling member with a flexible lip that is suitable for use in conjunction with standard flare type fittings having convex frustoconical surfaces for sealing. Another object of the invention is to provide a second coupling member with a stop mechanism which prevents over-torquing that could damage a recessed annular element that is part of the sealing means.

These and other objects or advantages of the invention are described in conjunction with the drawings wherein.

Figure 1:
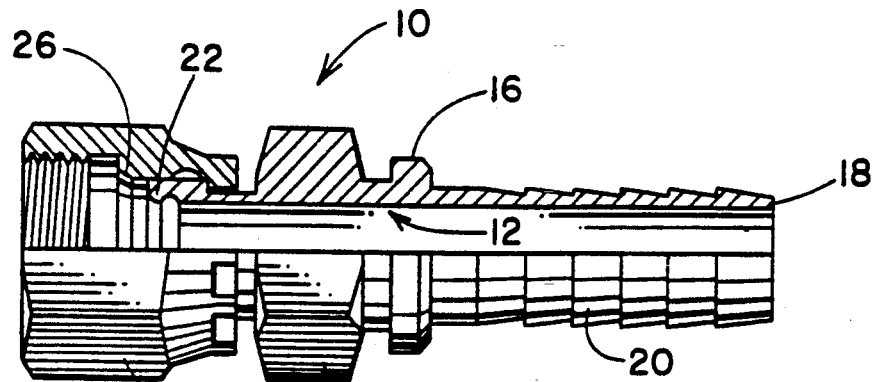
FIG. 1 is a partial axial sectional view of a coupling member of the invention with a swivel nut shown in axial cross-section.
Figure 3:
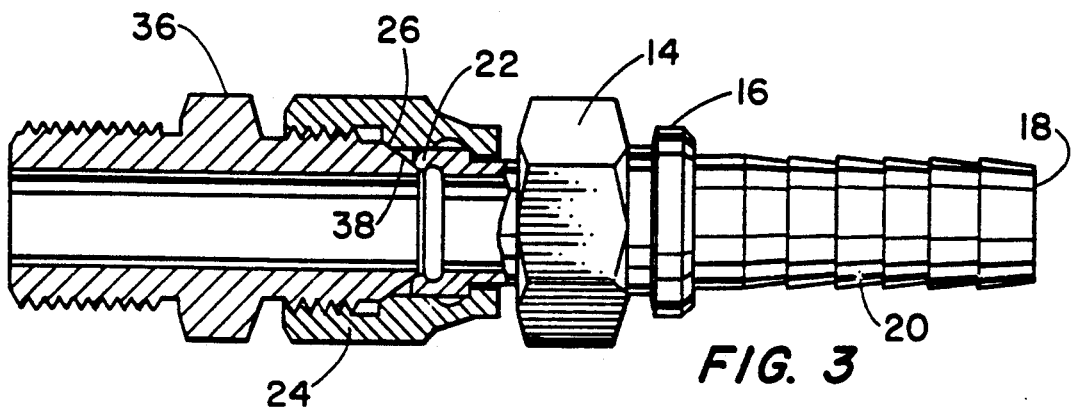
Figure 4:
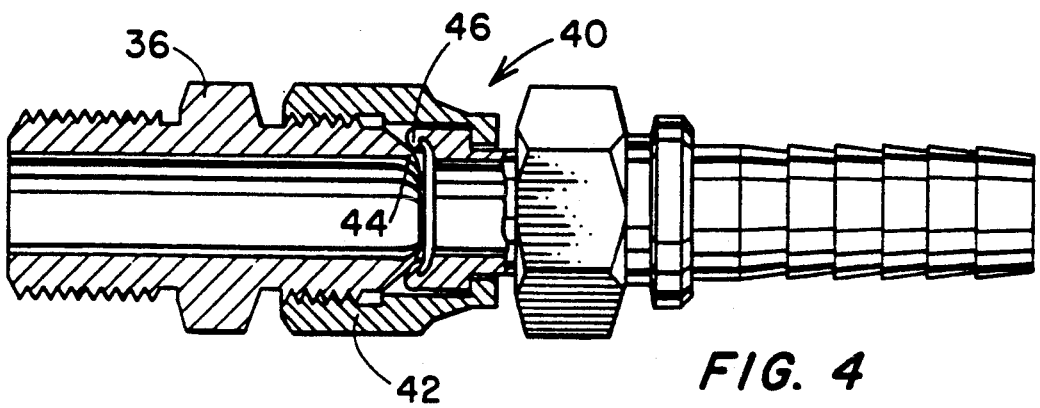

FIG. 3 is a partially sectioned view similar to FIG. 1 but showing the coupling member of the invention assembled with a conventional flare fitting where the swivel nut has been torqued to 200 percent of recommended torque; and FIG. 4 is a view similar to FIG. 4 showing a fitting of the type disclosed in U.S. Pat. No. 5,002,316 where the swivel nut has been torqued to 200 percent of the recommended torque.

Figure 2:
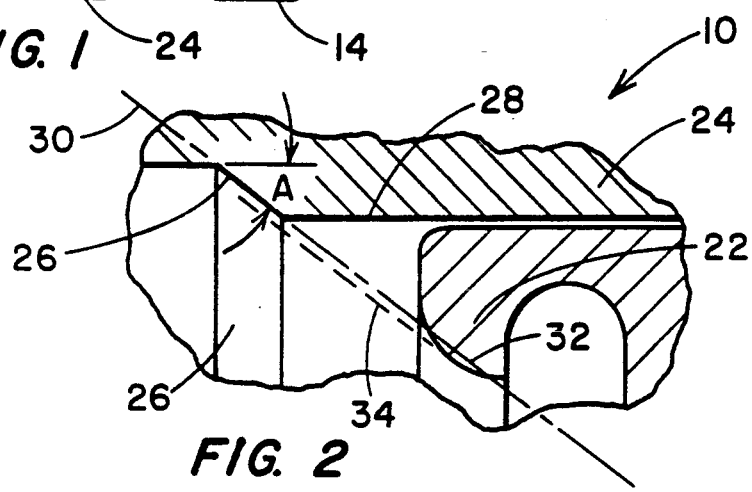
FIG. 2 is an enlarged and partial view taken along the line 2—2 of FIG. 1.
Figure 5:
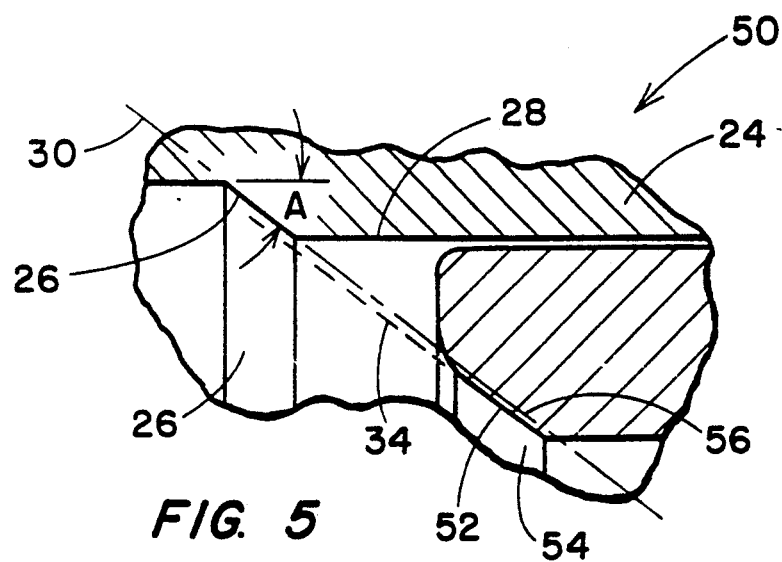

FIG. 5 is a view similar to FIG. 2 but showing the stop feature of the invention with a frustoconical surface for sealing with a conventional flare fitting.

DESCRIPTION OF PREFERRED EMBODIMENT

Referring to FIGS. 1 and 2, a coupling member 10 is shown which has a generally tubular body portion 12 that may optionally include configurations known in the art such as a wrenching surface 14, a ferrule locking collar 16 and a stem 18 that includes a plurality of serrations 20 suitable to enhance sealing with a hose, not shown. Of course, other known configurations may be used in conjunction with the generally tubular body portion 12 such as a male member with a threaded pipe portion, a bent tube, a manifold etc.

The coupling member is of the type with a recessed annular element that includes a flexible lip 22 and a swivel nut 24 as a means for attaching the coupling member to a second coupling member such as a standard flare fitting (not shown) and activating the flexible lip.

The swivel nut 24 has a concave frustoconical surface 26 that is located at a larger diameter 28 than the flexible lip 22. The frustoconical surface is at an angle A preferably selected from a range of about 37 degrees or 45 degrees and is generally positioned along an conic-line 30. More preferably, the conic-line 30 is tangent to the frustoconical surface 26 and intersects 32 the flexible lip 22. When the more preferred arrangement is used, the flexible lip 22 leads the frustoconical surface 26 toward the open end of the nut as illustrated by the dotted line 34 drawn tangent to the flexible lid 22 and parallel to the conic-line 30.

USE

To exemplify the features of the invention, a one-half inch coupling member was made with a flexible lip configured in accordance with the teaching of U.S. Pat. No. 5,002,316 and as illustrated in FIG. 3. The coupling member 10 was attached by means of the swivel nut to a standard, flare type male fitting 36 with a 37 degrees with a tapered end or frustoconical sealing surface 38. The arrangement of the lip seal with respect to the concave frustoconical surface 26 was substantially as illustrated in FIG. 2 with the flexible lip 22 leading the frustoconical surface 26 toward the open end of the swivel nut (i.e. toward the fitting 36) such that the flare fitting sealing surface 38 contacted lip seal 22 before it contacted the concave frustoconical surface 26 as the swivel nut was tightened. The leading arrangement of the lip assured a predetermined axial deflection of the lip seal when the nut was tightened. Preferably, the axial deflection of the lip is in a range from about 0.005 to about 0.015 inches for a one-half inch coupling member.

The swivel nut was torqued to 200 percent (76 ft.-lbs.) of recommended torque (38 ft.-lbs.) and there was no damage to either the flexible lip 22 or the sealing surface 38 of the male flare fitting. The concave frustoconical surface 26 operated as a means for contacting the tapered end of the flared fitting after deflection of the flexible lip and acted to supplement a resisting tightening torque of the swivel nut as the lip deflected. The supplemental resistive torque operated to inhibit the nut from being turned too far and thereby avoided damaging the tapered end of the flared fitting and the flexible lip.

To illustrate the sealing sensitivity of the coupling member of the invention to torque, it was attached to a standard flare type fitting and the swivel nut was successfully torqued at 30 percent (11 ft.-lbs.) 50 percent (19 ft.-lbs.) 75 percent (29 ft.-lbs.) 100 percent (38 ft.-lbs.) 150 percent (57 ft.-lbs.) and 200 percent (76 ft.lbs.) of recommended torque and pressure tested at 35,000 psi at each successive incremental torque. The assembled coupling exhibited substantially no leakage at each torque level and there was no permanent deformation to either the flexible lip or the tapered end of flare fitting to which the coupling member was attached. Accordingly, an advantage of the invention is that leakage is not sensitive to "under torquing" (30 percent) or "over torquing" (200 percent) of the swivel nut. Still another advantage is that there is a tactile feel to the swivel nut of the invention when it is torqued against a standard flare type fitting so as to prevent turning of the swivel nut. Stated in other terms, it prevents the standard flare type fitting from being drawn axially into a position where deformation of the fitting and flexible lip is incurred.

Referring to FIG. 4, a prior art coupling member 40 was constructed without the swivel nut feature of the present invention but it had all of the remaining similar features as depicted in FIG. 3 including the construction of the flexible lip in accordance with U.S. Pat. No. 5,002,316. The coupling member was attached to a standard 37 degree male flared fitting and the swivel nut 42 was torqued to 200 percent (76 ft.-lbs.) of recommended torque. Lacking the features of the present invention, the swivel nut 42 was over-rotated in reaching the 200 percent torque value causing the end of flare fitting 40 to be permanently deformed 44. The flexible lip 46 was deflected to such an extend that it exceeded its elastic limit and was also permanently deformed. Moreover, upon disassembly, the swivel nut was binding.

ALTERNATE EMBODIMENT OF THE INVENTION

Referring to FIG. 5, an alternate embodiment of a coupling member 50 is shown which has generally the same construction as that of FIG. 2 except for a recessed annular element 52 with a frustoconical surface 54 as a sealing means. The coupling member includes a swivel nut 24, a concave frustoconical surface 26 that is located at a larger diameter 28 than the recessed annular element 52, and a frustoconical surface at an angle. Similar to that defined in conjunction with FIG. 2, an conic-line 30 is tangent to the frustoconical surface 26 and intersects 56 the recessed annular element 52 in such a manner that the frustoconical surface 54 leads the frustoconical surface 26 toward the open end of the nut as illustrated by the dotted line 34 drawn tangent to the frustoconical surface 54.

To illustrate the improvement of the alternate embodiment of the invention, a prior art one-half inch flare type fitting and coupling nut was compared to a one-half inch flare type fitting using a coupling nut of the invention having a recessed annular sealing means and a stop feature. The nut of the invention had 1) a recessed annular element as a sealing means and in the form of a tapered surface, and 2) a concave frustoconical surface as a torque inhibiting device where the sealing surface led the frustoconical surface by 0.040 inches. The nuts were torqued at successively increasing percentages of rated torque where 100% equaled 38 ft-lbs. Pressure and leakage results. The following tables summarize the results of the testing:

| TORQUE % | NUT ROTATION/ FLATS | PRESSURE PSI | RESULTS |
| --- | --- | --- | --- |
| This invention: | | | |
| 30 | .38 | 13,230 | leak |
| 50 | 1.00 | 25,120 | leak |
| 75 | 1.25 | 26,925 | leak |
| 100 | 1.00 | 31,320 | leak |
| 150 | 2.00 | 31,350 | rupture |
| 200 | 2.35 | 31,295 | rupture |
| Prior Art: | | | |
| 30 | .65 | 12,500 | leak |
| 50 | .90 | 15,500 | leak |
| 75 | 1.15 | 20,200 | leak |
| 100 | 1.50 | 30,000 | rupture |
| 150 | 2.50 | 30,800 | rupture |
| 200 | 3.95 | 30,800 | rupture |

From the above test data, it is ascertained that the coupling member of the invention exhibited an improvement over that of the prior art in terms higher pressures for withstanding leakage for successive torque values up to 100%. The improvement associated with leakage is believed to be the result of a smaller annular frustoconical sealing surface of the stem compared to prior art flare fittings. Also, it took less rotation of the nut as expressed in number of wrenching flats to reach a torque level which is an improvement in tactile feel to an operator torquing the nut.

An advantage of the coupling member of the invention is the location of the recessed surface and frustoconical surface relative to the location of threads for tightening the nut. The recessed annular sealing surface leads the frustoconical surface in contacting the tapered surface of the flared fitting. Further rotation of the nut operates to engage the frustoconical surface. The recessed annular surface is pulled into engagement at the rear of the nut in a load transferring path to the stem which includes the recessed annular sealing surface. Once the frustoconical surface contacts the tapered surface of the flared fitting, the load path is direct from the threads whereby additional loading to the sealing surface that could cause damage is avoided or substantially reduced.

The foregoing detailed description is given for purpose of illustration only and is not intended to limit the scope of the invention which is to be established by the appended claims.

What is claimed is:

1. In a coupling member of the type having a generally tubular body portion with a flexible lip as a means for sealing, and a swivel nut attached substantially concentrically to the body portion juxtaposed the flexible lip, the improvement comprising:

the swivel nut having a concave frustoconical surface located at a larger diameter than the flexible lip and the flexible lip generally positioned in alignment with a conic line tangent to the frustoconical surface such that the conic line intersects the flexible lip opposite a sealing surface portion of the flexible lip.

2. The coupling member of claim 1 wherein the concave frustoconical surface defines a means for contacting a tapered surface of a second coupling member and supplementing a resistive tightening torque of the swivel nut.

3. The coupling member of claim 1 wherein the swivel nut includes means for inhibiting radially outward deflection of the flexible lip.

4. The coupling member of claim 1 wherein the flexible lip has an outer surface that is convex curvilinear when viewed in axial cross-section.

5. The coupling member of claim 1 wherein the concave frustoconical surface is disposed at an angle from about 37 degrees to about 45 degrees.

6. In a coupling member of the type having a generally tubular body portion with a flexible lip as a means for sealing, and a swivel nut attached substantially concentrically to the body portion juxtaposed the flexible lip, the improvement comprising:

the swivel nut having an open end, and a concave frustoconical surface located at a larger diameter than the flexible lip and a sealing surface portion of the flexible lip generally positioned in alignment with a conic line tangent to the frustoconical surface.

7. The coupling member of claim 6 wherein the sealing surface portion of flexible lip leads the frustoconical surface along the conic line toward the open end of the swivel nut.

8. In a coupling member of the type having a generally tubular body portion with a recessed annular element as a means for sealing, and a swivel nut attached substantially concentrically to the body portion juxtaposed the recessed annular element the improvement comprising:

the swivel nut having a concave frustoconical surface located at a larger diameter than the recessed annular element and the recessed annular element generally positioned in alignment with a conic line tangent to the frustoconical surface such that the conic line intersects the recessed annular element opposite a sealing surface portion of the recessed annular element.

9. The coupling member of claim 8 wherein the concave frustoconical surface defines a means for contacting a tapered surface of a second coupling member and supplementing a resistive tightening torque of the swivel nut.

10. The coupling member of claim 8 wherein the recessed annular element is in the form of a flexible lip having an outer surface that is convex curvilinear when viewed in axial cross-section.

11. The coupling member of claim 8 wherein the concave frustoconical surface is disposed at an angle from about 37 degrees to about 45 degrees.

12. The coupling member of claim 8 wherein the recessed annular element defines a second, frustoconical surface as the sealing means.

13. In a coupling member of the type having a generally tubular body portion with a recessed annular element as a means for sealing, and a swivel nut attached substantially concentrically to the body portion juxtaposed the annular element, the improvement comprising:

the swivel nut having an open end, and a concave frustoconical surface located at a larger diameter than the recessed annular element and a sealing surface portion of the annular element generally positioned in alignment with a conic element tangent to the frustoconical surface.

14. The coupling member of claim 13 wherein the sealing surface portion of the recessed annular element leads the frustoconical surface along the conic line toward the open end of the swivel nut.

* * * * *